US012230238B2

(12) United States Patent
Shiraishi

(10) Patent No.: US 12,230,238 B2
(45) Date of Patent: Feb. 18, 2025

(54) KEYBOARD INSTRUMENT

(71) Applicant: CASIO COMPUTER CO., LTD., Tokyo (JP)

(72) Inventor: Yasushi Shiraishi, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 160 days.

(21) Appl. No.: 18/078,172

(22) Filed: Dec. 9, 2022

(65) Prior Publication Data

US 2023/0197045 A1 Jun. 22, 2023

(30) Foreign Application Priority Data

Dec. 22, 2021 (JP) ................................ 2021-207672

(51) Int. Cl.
*G10H 1/34* (2006.01)
*G10C 3/12* (2006.01)

(52) U.S. Cl.
CPC ............... *G10H 1/346* (2013.01); *G10C 3/12* (2013.01)

(58) Field of Classification Search
CPC .................................. G10H 1/346; G10C 3/12
See application file for complete search history.

(56) References Cited

U.S. PATENT DOCUMENTS 7,176,370 B2 * 2/2007 Osuga .................... G10H 1/346 84/433
7,541,532 B2 * 6/2009 Osuga .................... G10H 1/346 84/436
7,550,664 B2 6/2009 Kamshima et al.
7,652,207 B2 * 1/2010 Osuga .................... G10H 1/346 84/433
2015/0122108 A1 * 5/2015 Takata ................... G10H 1/346 84/433
2023/0197045 A1 * 6/2023 Shiraishi .................. G10C 3/12 84/423 R
2023/0351991 A1 * 11/2023 Taniguchi .............. G10H 1/346
2023/0351992 A1 * 11/2023 Shiraishi ................ G10H 1/346

FOREIGN PATENT DOCUMENTS

JP S51121316 U 10/1976
JP 2005107493 A 4/2005
JP 2006285057 A 10/2006
JP 2009229515 A 10/2009

OTHER PUBLICATIONS

Japanese Office Action (and an English language translation thereof) dated Nov. 7, 2023, issued in counterpart Japanese Application No. 2021-207672.

* cited by examiner

*Primary Examiner* — Robert W Horn
(74) *Attorney, Agent, or Firm* — Holtz, Holtz & Volek PC

(57) ABSTRACT

A keyboard instrument includes a key base member, a first member which is disposed on either of a left and a right of the key base member, and a second member which is disposed on the other side of disposing the first member, and a length hb in an up-down direction of a portion of the first member which corresponds to a nearer side of a key differs from a length ha in the up-down direction of a portion of the second member which corresponds to the nearer side of the key.

15 Claims, 12 Drawing Sheets

KEYBOARD INSTRUMENT

CROSS-REFERENCE TO RELATED APPLICATION

This patent application is based upon and claims the benefit of priority under 35 USC 119 of Japanese Patent Application No. 2021-207672 filed on Dec. 22, 2021, the entire disclosure of which, including the specification, claims, drawings, and abstract, is incorporated herein by reference in its entirety.

BACKGROUND

Technical Field

The present invention relates to a keyboard instrument.

Description of the Related Art

Conventionally, there have been disclosed keyboard instruments including keys the quality of which is improved by disposing a woody member on side surfaces of a key base member. For example, Japanese Patent Laid-Open No. 2009-229515 (JP-A-2009-229515) discloses a keyboard instrument in which for example, with an E key, a woody member is affixed to a left side surface corresponding to a wide portion of the key, while no woody member is affixed to a left side surface corresponding to a narrow portion of the key, and a woody member is affixed to the whole of a right side surface of the key which continues from the wide portion to the narrow portion. Then, a length in an up-down direction of the woody member is made the same.

SUMMARY

In some keyboard instruments, the shape of a case is often thought out with a view to improving the design of the keyboard instrument. Then, it is often desired that a woody member becomes visible without interruption not only from side surfaces of a key when keys adjacent thereto are depressed down but also from various angles at which the keyboard instrument is viewed.

An advantageous effect of the present invention is to provide a keyboard instrument in which a woody member becomes visible from side surfaces of keys without interruption even from various angles at which the keyboard instrument is viewed to thereby improve the quality of the keyboard instrument.

A keyboard instrument according to the present invention includes a key base member, a first member disposed on either of a left side and a right side of the key base member, and a second member disposed on the other side of disposing the first member of the key base member, wherein a length in an up-down direction of a portion of the first member which corresponds to a nearer side of a key differs from a length in the up-down direction of a portion of the second member which corresponds to the nearer side of the key.

DESCRIPTION OF THE EMBODIMENT

Figure 1:
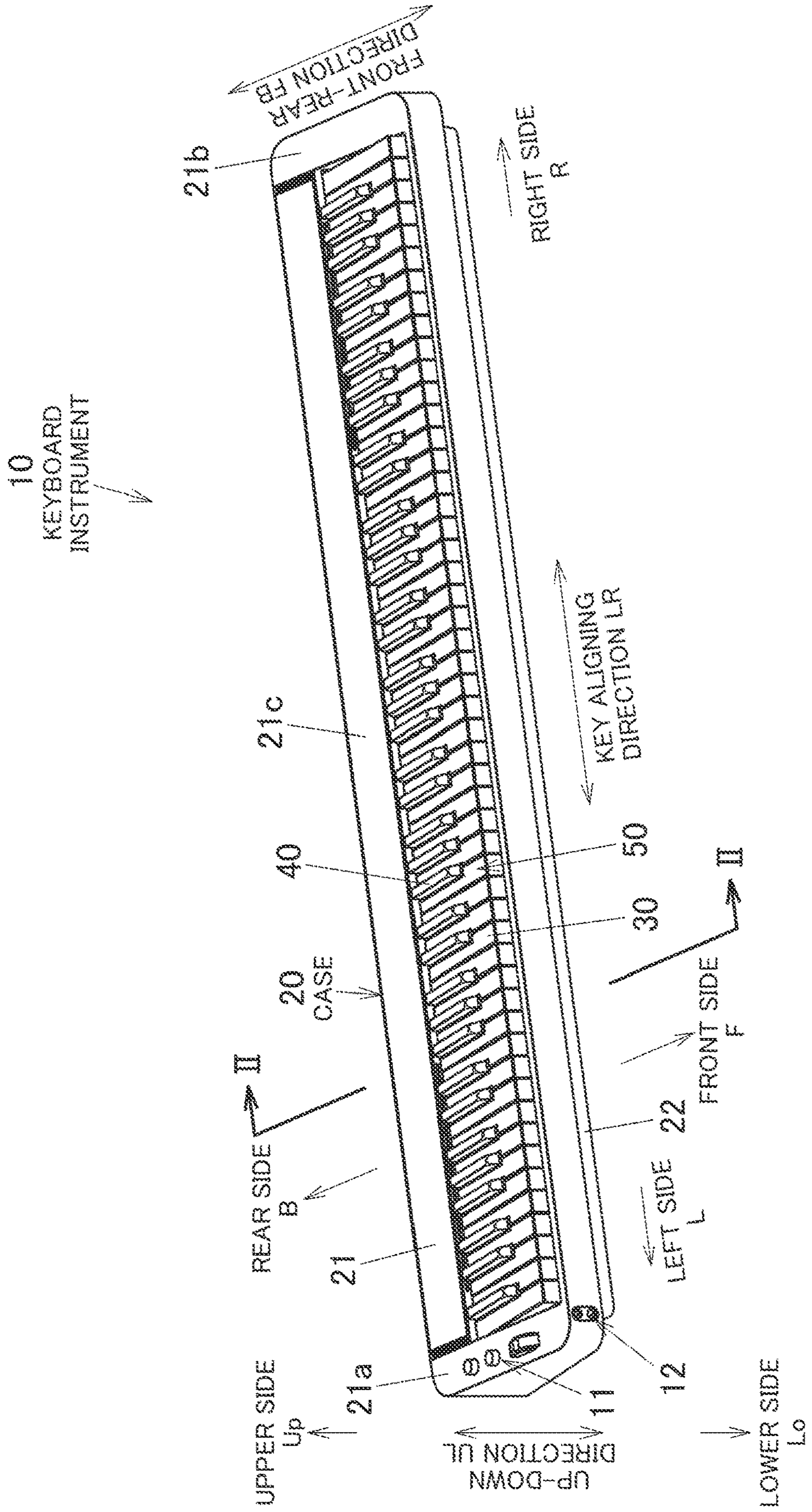
FIG. 1 is a perspective view showing a keyboard instrument according to an embodiment of the present invention.

Hereinafter, an embodiment of the present invention will be described based on drawings. A keyboard instrument 10 shown in FIG. 1 includes a full-size (88-key) keyboard 50, which includes multiple white keys 30 and multiple black keys 40 as multiple keys, and a case 20. In the following description, a front of keys of the keyboard 50 in a front-rear direction FB thereof is referred to as a front side F, and a rear of the keys in the front-rear direction FB is referred to as a rear side B, while with a spectator facing the keyboard 50, a left of the keyboard 50 is referred to as a left side L, and a right thereof is referred to as a right side R. A key aligning direction LR in which keys are aligned in the keyboard 50 is referred to as a left-right direction. In addition, in an up-down direction UL of the keyboard instrument 10, an upside is referred to as an upper side Up, and a low side is referred to a lower side Lo of the keyboard instrument 10. In the present embodiment, although the keyboard instrument 10 is described as an electronic piano, the keyboard instrument 10 may be other keyboard instruments, provided that a sound is produced therefrom in association with depressing a key by a player (a user).

The case 20 has a substantially rectangular plate-like shape with its longitudinal direction oriented in the left-right direction and is divided into an upper case 21 and a lower case 22. The upper case 21 and the lower case 22 are each formed from a resin material. A circuit board, a battery constituting a power supply, and the like are accommodated in an interior of the case 20. A control section 11, where knobs and a dial for a volume control and various types of settings are provided, is provided on an upper surface of a left-end part of the upper case 21. Additionally, an earphone jack is provided on a front surface of the left-end part of the upper case 21.

An upper surface 21*a* of the upper case 21 which lies adjacent to the keyboard 50 at the left-end part of the upper case 21 and an upper surface 21*b* of the upper case 21 which lies adjacent to the keyboard 50 at the right-end part of the upper case 21 are each formed into a sloping surface which slopes downwards from the rear to the front. In addition, an upper surface 21*c*, elongated in the left-right direction and provided at a central part of the upper case 21, is also formed into a sloping surface which slopes downwards from the rear to the front. Although not shown, a hole portion is provided in a rear surface of the upper case 21 in such a manner as to correspond to a speaker.

Figure 2:
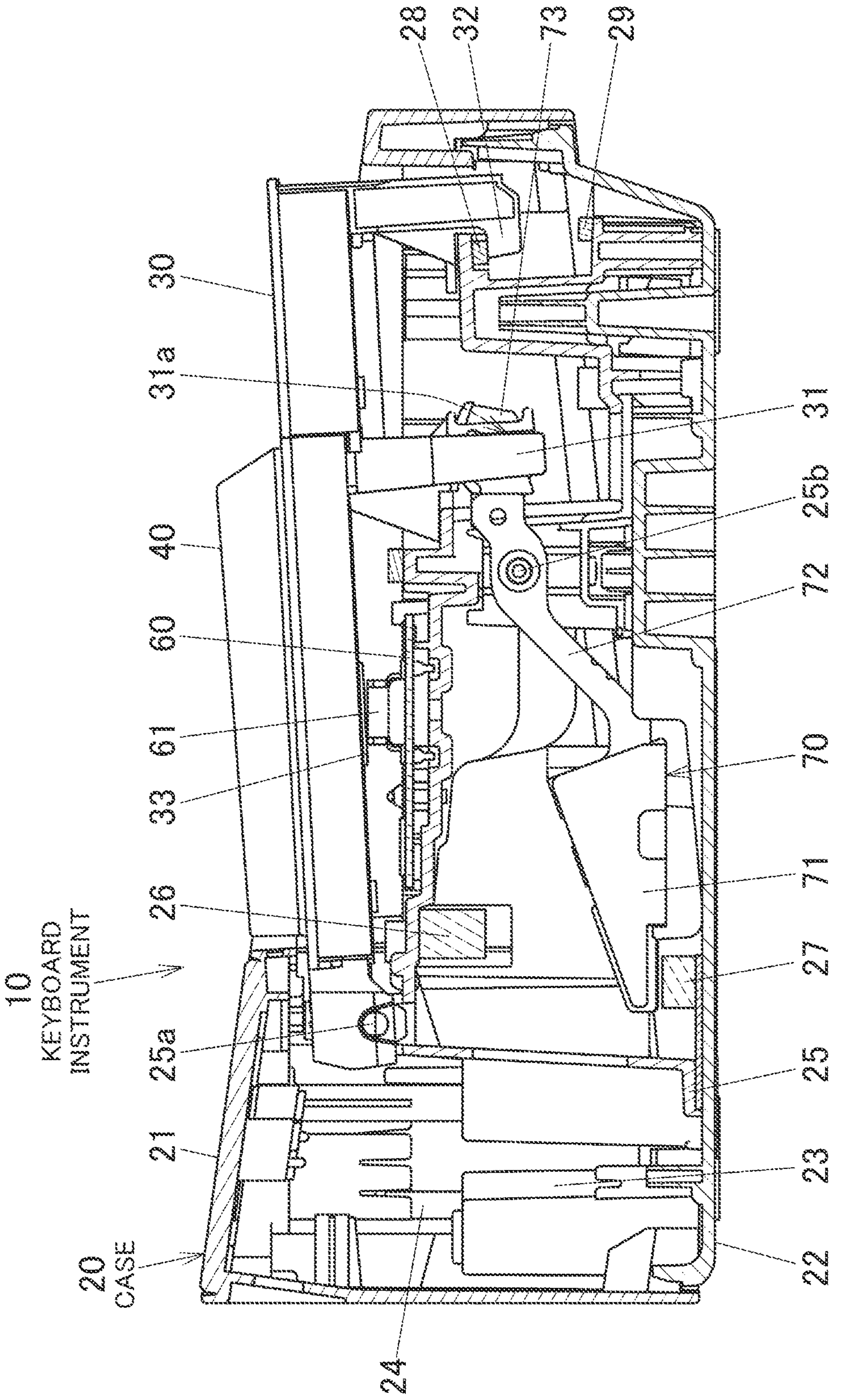
FIG. 2 is a sectional view of the keyboard instrument according to the embodiment of the present invention, taken along a line II-II in FIG. 1 and showing side surfaces of a white key and a black key.

As shown in FIG. 2, in the case 20, a lower boss portion 23, which is provided in such a manner as to rise upwards from the lower case 22, and an upper boss portion 24, which is provided in such a manner as to extend downwards from the upper case 21, are joined together though a threading engagement or the like, whereby the upper case 21 and the lower case 22 are assembled together. An interior case 25 is provided in the interior of the case 20. The interior case 25 is provided in such a manner as to be long in the key aligning direction LR and has a substantially U-shaped section which opens downwards in the lower side Lo as shown in a sectional view in FIG. 2. A circuit board 60 is provided on an upper surface of the interior case 25. Multiple switches 61 are provided on the circuit board 60 in such a manner as to correspond individually to the white keys 30 and the black keys 40. A switch pressing portion 33 is provided individually on the white keys 30 and the black keys 40 in such a position that corresponds to the corresponding switch 61 (in FIG. 2, a switch pressing portion 33 for the white key 30 is shown, and a switch pressing portion for the white key 40 is not shown).

A support shaft 25*a*, which is configured to support rotatably the white keys 30 and the black keys 40, is provided at the rear of the interior case 25 in such a manner as to correspond to the white keys 30 and the black keys 40. A hammer member 70 is provided for each white key 30 and each black key 40 inside the interior case 25. A weight portion 71 is provided at a rear side B of the hammer member 70. An arm portion 72, which extends to the front side F from the weight portion 71, is supported rotatably by a support shaft 25*b* which is provided in the interior case 25. A hammer cap 73 is provided at a distal end of the arm portion 72 in such a manner as to be brought into engagement with a hammer pressing portion 31 (in FIG. 2, a hammer pressing portion 31 for the white key 30 is shown, and a hammer pressing portion for the black key 40 is not shown) which extends downwards towards the lower side Lo from each white key 30 and each black key 40. A hole portion 31*a* is provided in the hammer pressing portion 31 for engagement with the hammer cap 73. In addition, a hook-shaped restricting projection 32 (in FIG. 2, a restricting projection 32 for the white key 30 is shown, and a restricting projection for the black key 40 is not shown) is provided at a front-end portion of each white key 30 and each black key 40 in such a manner as to extend downwards towards the lower side Lo, eventually causing a distal end portion thereof to project to the rear.

Taking the white key 30 for example, operations of the white key 30 and the hammer member 70 will be described. When the white key 30 is depressed down, the hammer pressing portion 31 of the white key 30 depresses down the hammer cap 73. Then, the weight portion 71 of the hammer member 70, which is provided in such a manner as to face the hammer cap 73 across the support shaft 25*b*, is caused to rise. In this way, the player can depress down the white key 30 while feeling a weight sensation identical to a sensation that he or she feels when he or she plays a real upright or grand piano. Then, the weight portion 71, which is caused to so rise, is brought into abutment with a hammer upper cushion 26, which is provided inside the interior case 25.

Figure 5:
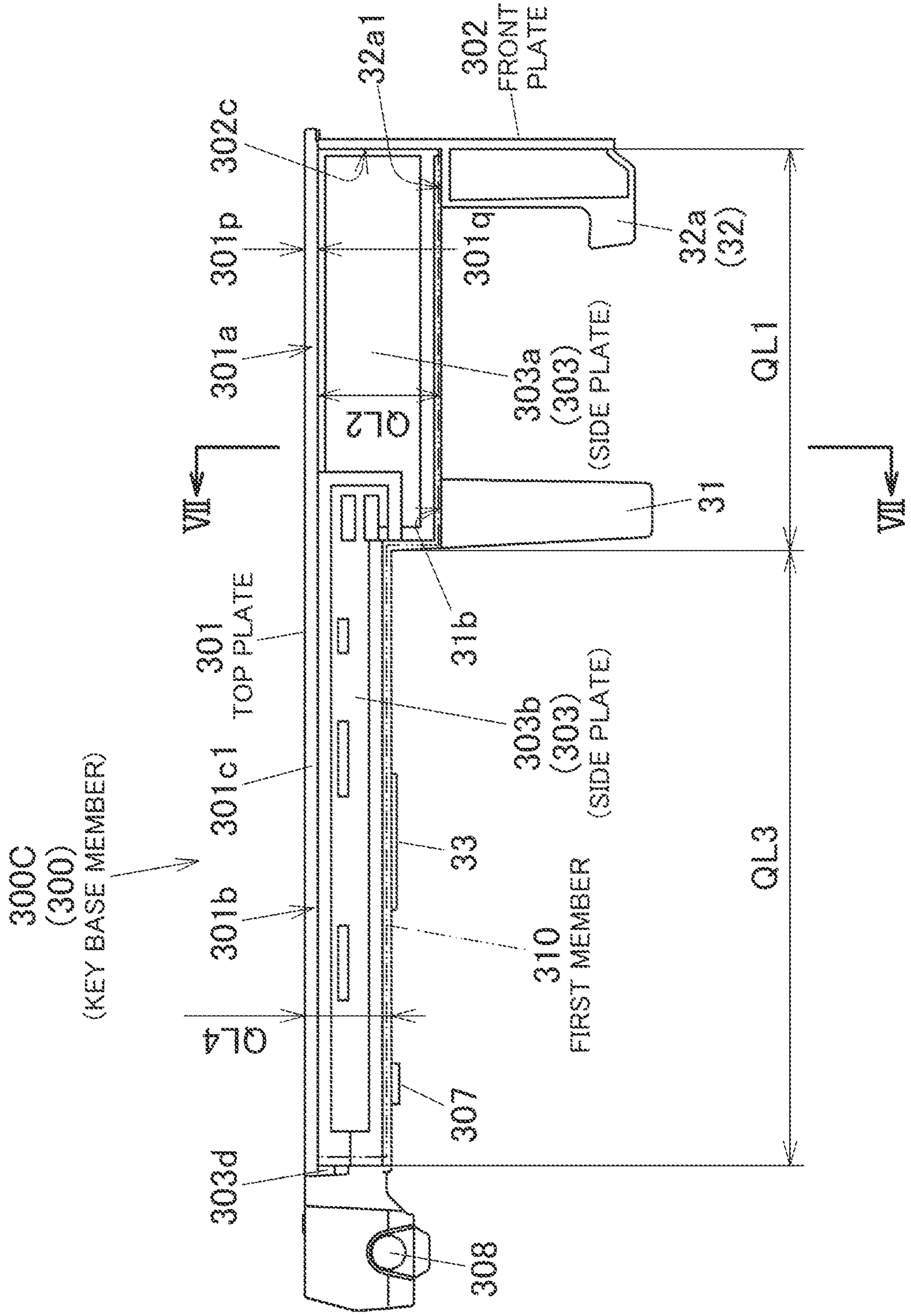
FIG. 5 is a left-side view of a key base member of the C key of the keyboard instrument according to the embodiment of the present invention.
Figure 6:
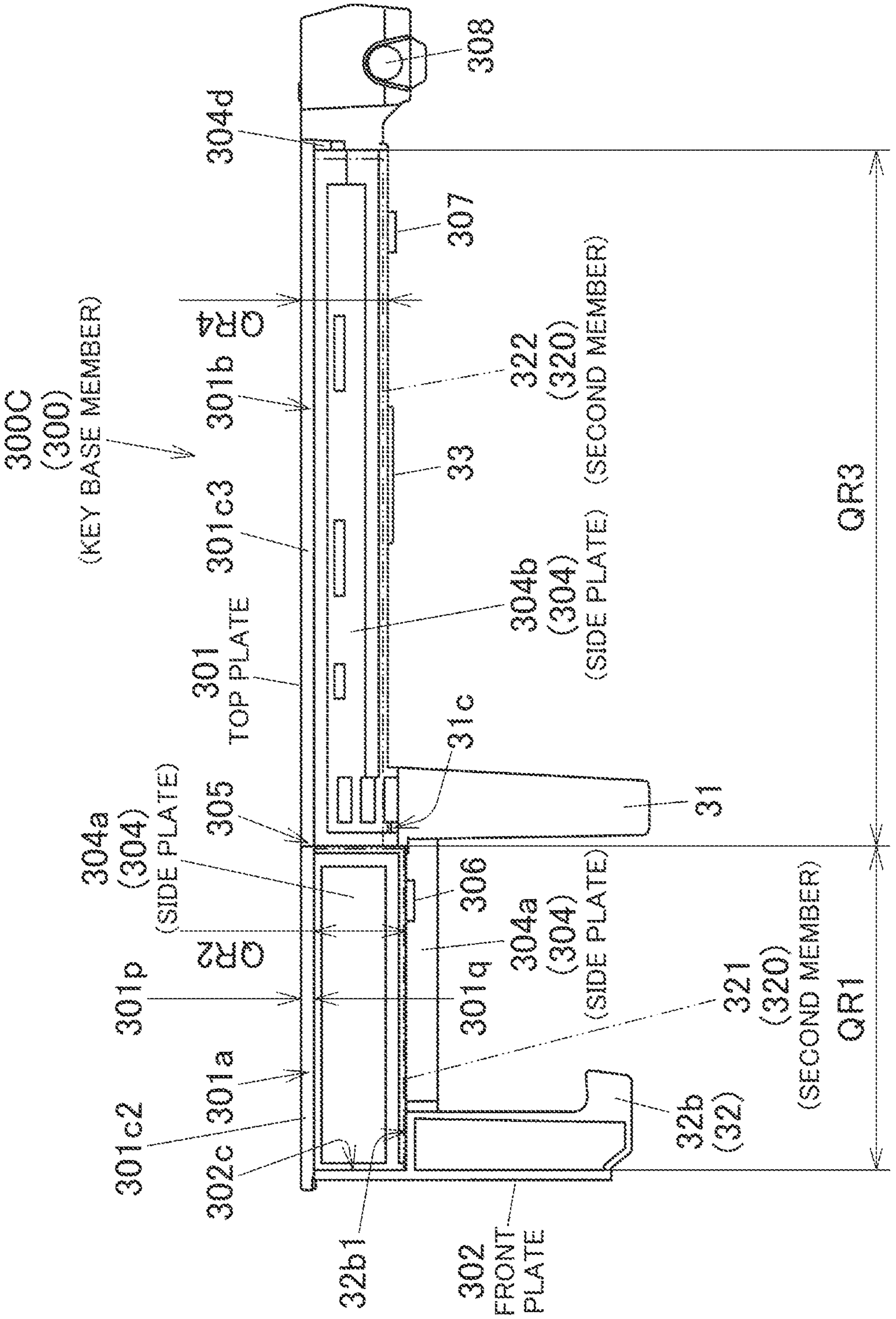
FIG. 6 is a right-side view of the key base member of the C key of the keyboard instrument according to the embodiment of the present invention.

On the other hand, the restricting portion 32 is depressed down in association with the white key 30 being depressed down and is then brought into abutment with a lower cushion 29, which is provided in such a manner as to face the restricting portion 32. In addition, when the white key 30 is depressed down, the switch 61 is depressed down by the switch pressing portion 33 which is provided on the white key 30, whereby a sound or note corresponding to the white key 30 so depressed down is produced for radiation. Then, when the player moves his or her finger, which is depressing down the white key 30, away from the white key 30, the weight portion 71 of the hammer member 70 is lowered to thereby be brought into abutment with a lower cushion 27, and a jaw portion of the restricting projection 32 is brought into abutment with an upper cushion 28, whereby a state shown in FIG. 2 results. Here, as shown in FIGS. 5 and 6, the restricting portion 32 is made up of a left plate-shaped restricting projection 32*a* and a right plate-shaped restricting projection 32*b*.

Figure 3:
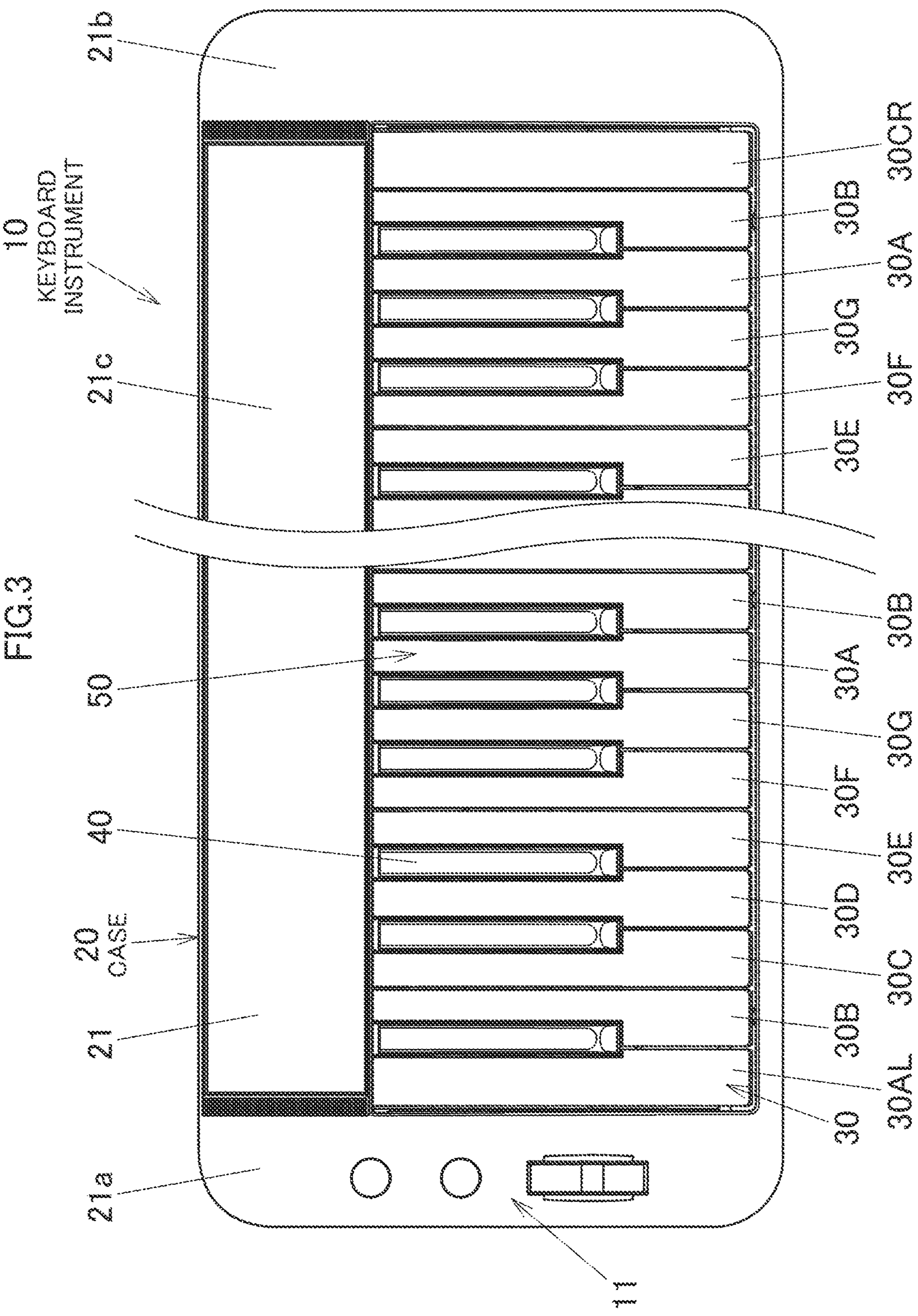
FIG. 3 is a top view of the keyboard instrument according to the embodiment of the present invention, in which a left part and a right part of the keyboard instrument are shown in an enlarged fashion with an intermediate part omitted from illustration.

As shown in FIG. 3, the multiple white keys 30 of the keyboard 50 have different shapes depending upon their positions (their scales). That is, a leftmost white key 30AL at the left side L of the keyboard 50 and a rightmost white key 30CR at the right side R of the keyboard 50 in the key aligning direction LR have shapes inherent thereto which differ from shapes of the other white keys 30. Multiple white keys 30A, which function as an A key denoting a note scale of A, are provided between the leftmost white key 30AL and the rightmost white key 30CR. Similarly, multiple white keys 30B to 30G are provided between the white key 30AL and the white key 30CR. A black key 40 is disposed at the left side L and the right side R of each of the white keys 30A, 30D, 30G. A black key 40 is disposed at the left side L or the right side R of each of the white keys 30B, 30C, 30E, 30F. As a result, in the following description, the white keys 30C, 30D and the leftmost and rightmost white keys 30AL, 30CR will be described as representing the other white keys 30.

Figure 8:
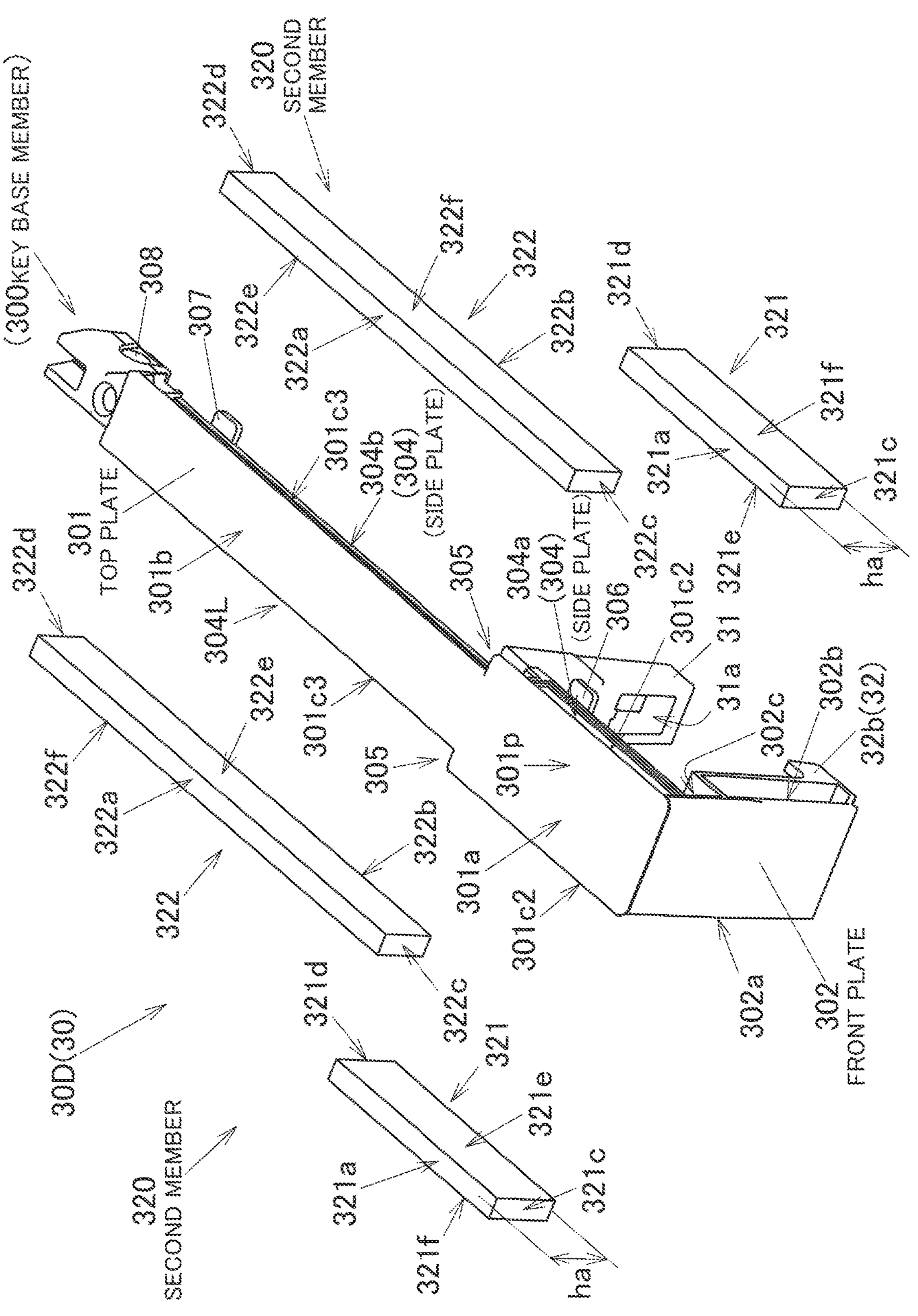
FIG. 8 is an exploded perspective view of a white key of a D key of the keyboard instrument according to the embodiment of the present invention.
Figure 9:
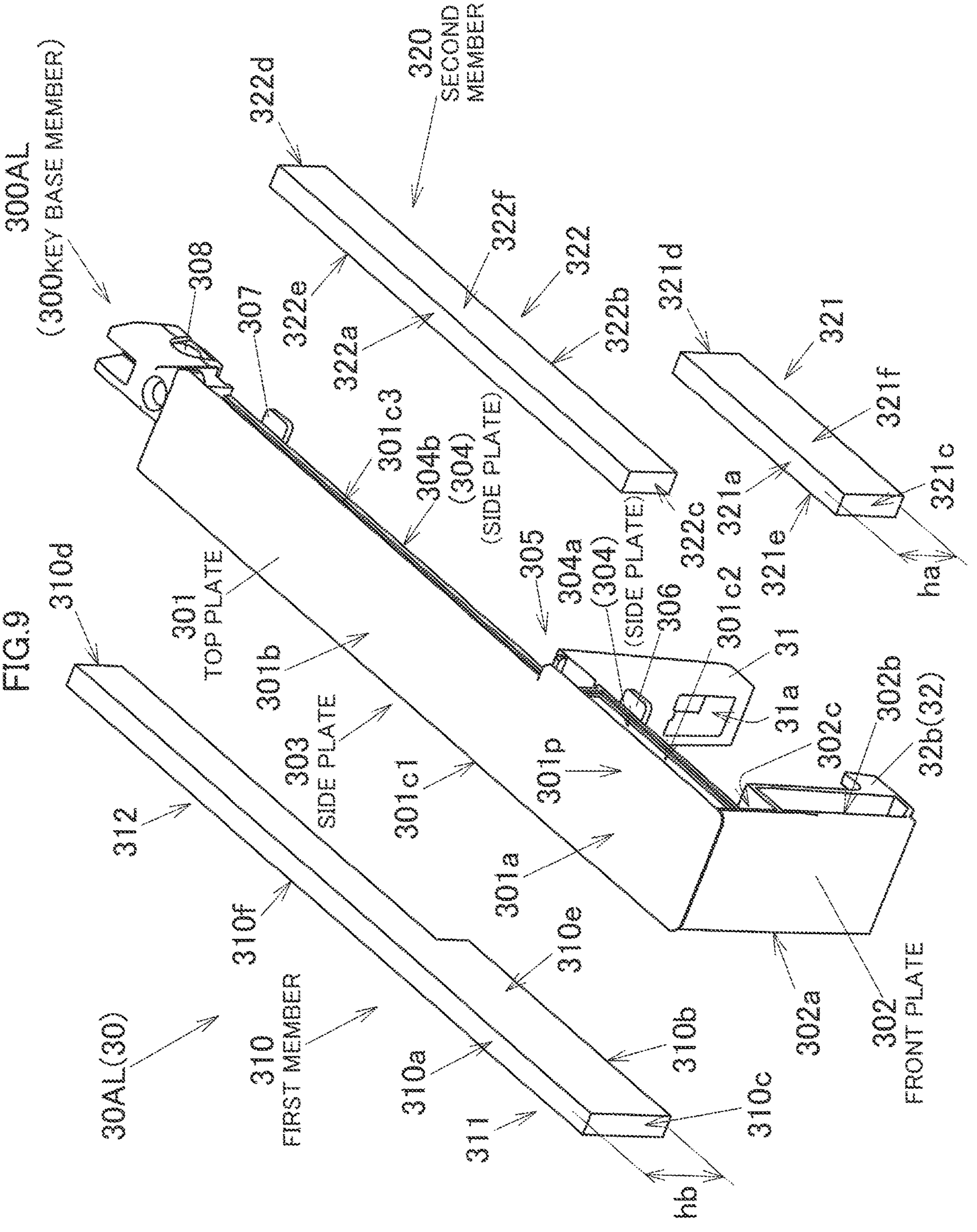
FIG. 9 is an exploded perspective view of a white key of a leftmost A key of the keyboard instrument according to the embodiment of the present invention.
Figure 10:
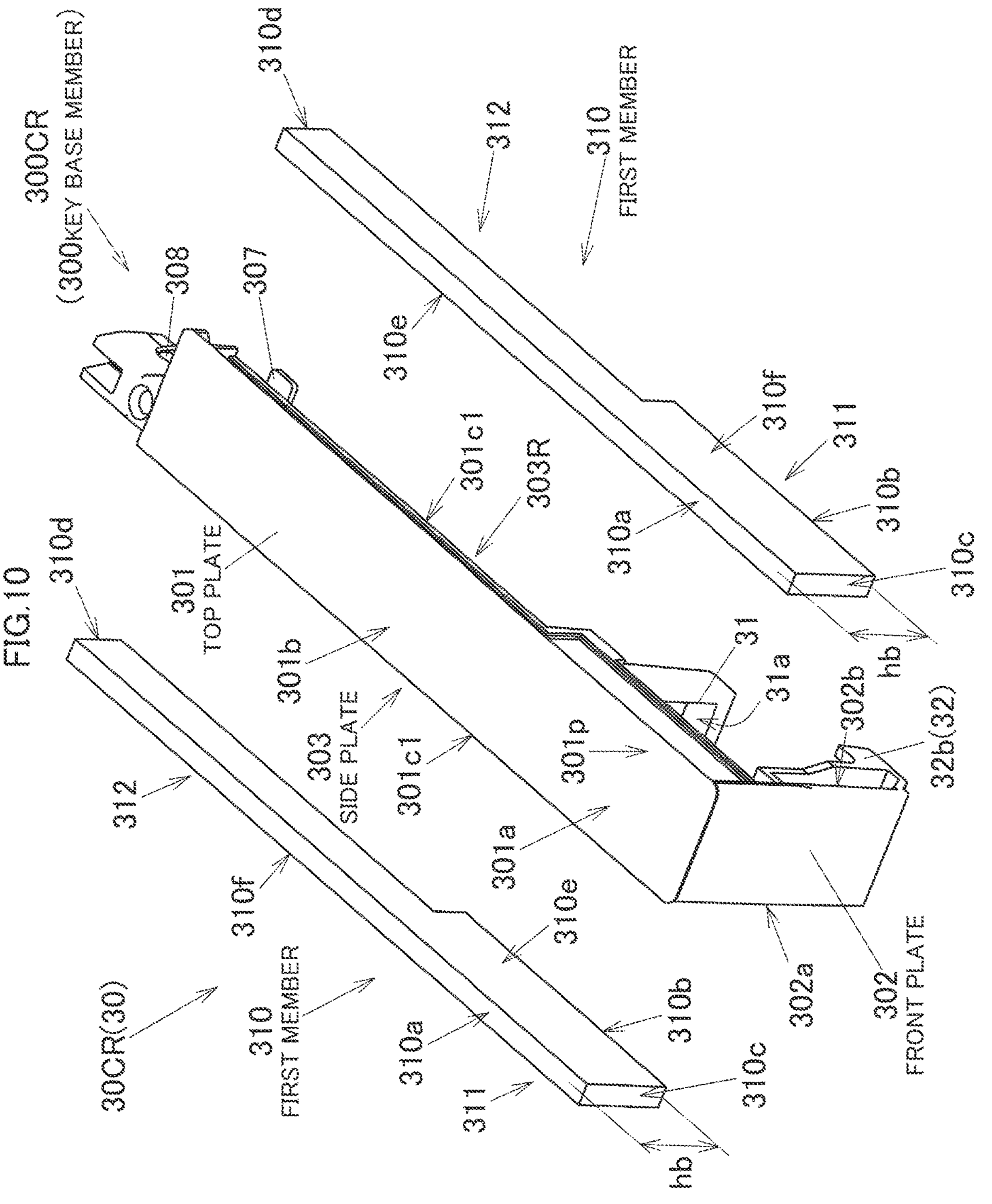
FIG. 10 is an exploded perspective view of a white key of a rightmost C key of the keyboard instrument according to the embodiment of the present invention.
Figure 11:
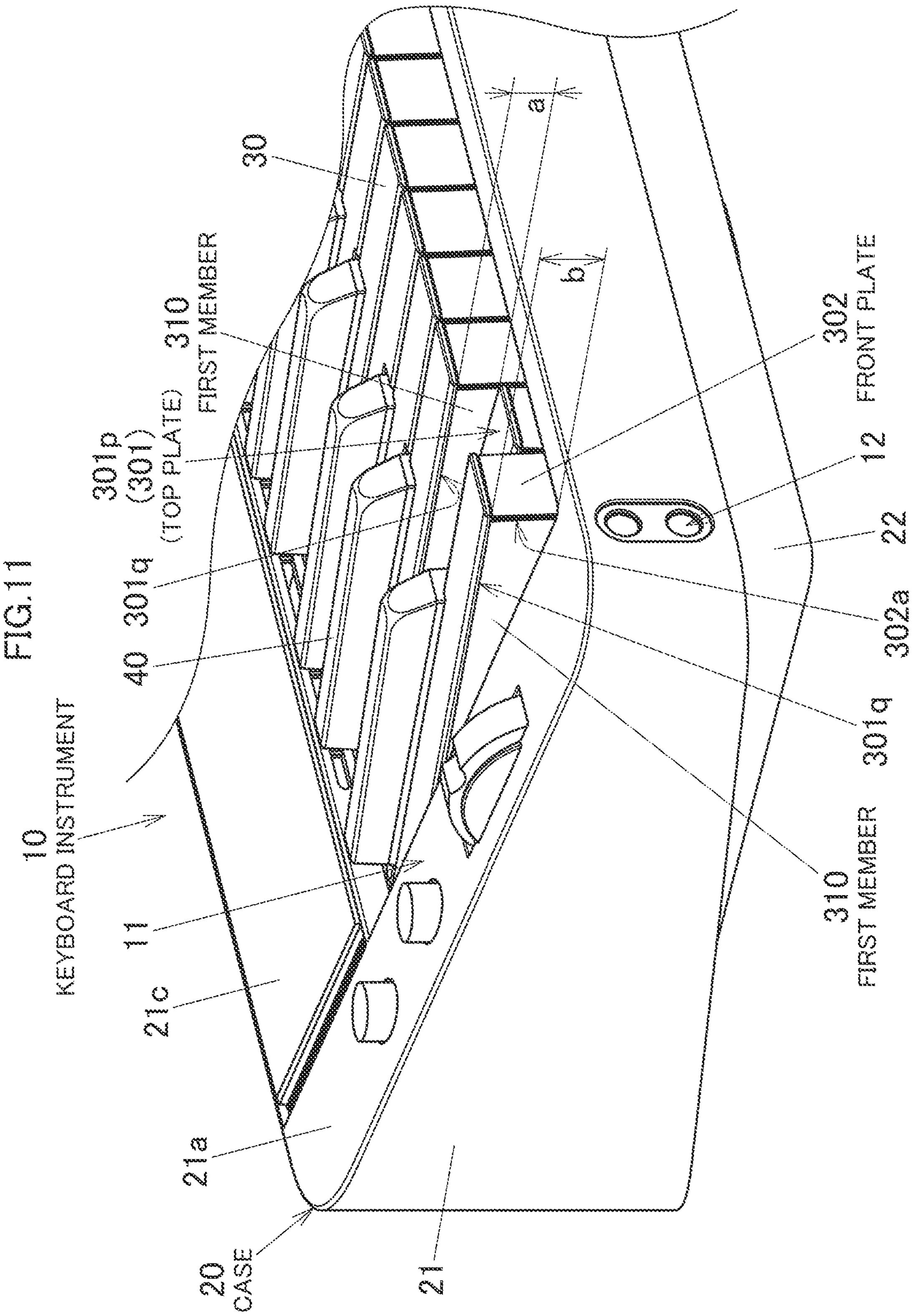
FIG. 11 is a perspective view showing the left part of the keyboard instrument according to the embodiment of the present invention in such a state that a key is depressed down.
Figure 12:
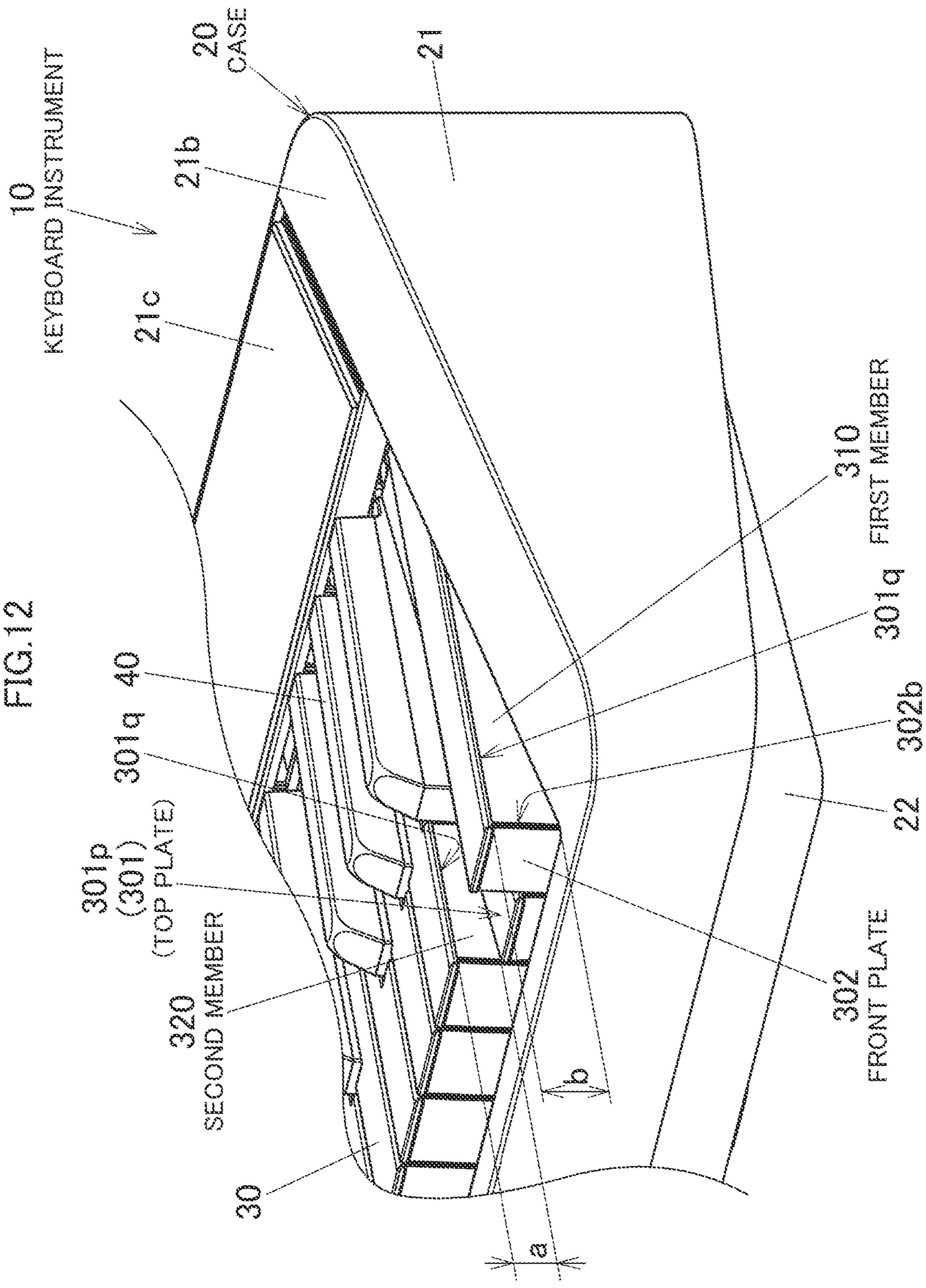
FIG. 12 is a perspective view showing the right part of the keyboard instrument according to the embodiment of the present invention in such a state that a key is depressed down.

Here, as shown in FIGS. 8 to 10, the white key 30 has, as a basic configuration, a key base member 300, which is formed from a resin material through injection molding, as well as a first member 310 and a second member 320, which are disposed individually on a left-side surface and a right-side surface of the key base member 300.

Figure 4:
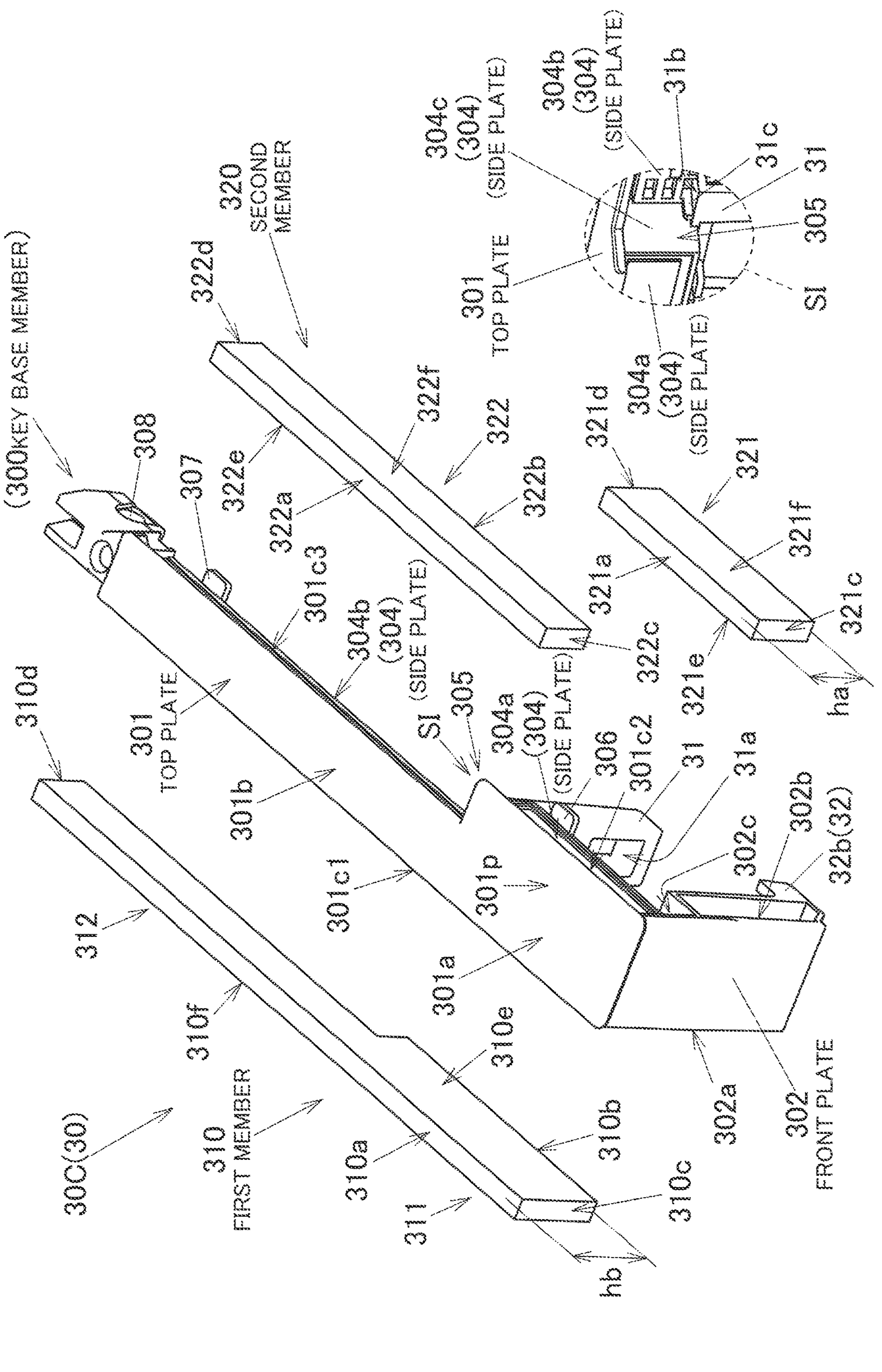
FIG. 4 is an exploded perspective view showing a white key of a C key of the keyboard instrument according to the embodiment of the present invention.

Referring to FIGS. 4 to 7, the white key 30C will be described. As shown in FIG. 4, the white key 30C includes a first member 310, a second member 320, and a key base member 300C. The key base member 300C is produced from a resin material through injection molding. The hammer pressing portions 31, the restricting projections 32, and the switch pressing portions 33 (refer to FIGS. 5, 6), which have already been described before, are provided on the key base member 300C. A step portion 305 is provided on a right side R of the key base member 300C. A portion of the key base member 300C which lies rearwards of the step portion 305 constitutes a narrow portion which is disposed adjacent to the black key 40, whereas a portion of the key base member 300C which lies forwards of the step portion 305 constitutes a wide portion including a key depressing surface.

The key base member 300C includes a top plate 301. The top plate 301 includes a wide portion 301*a* which lies forwards of the step portion 305 and a narrow portion 301*b* which lines rearwards of the step portion 305. A front plate 302 is provided at a front end portion of the top plate 301 in such a manner as to extend downwards towards the lower side Lo from a lower surface 301*q* (refer to FIGS. 5, 6). The front plate 302 is disposed in such a manner that a plate surface thereof is oriented towards the front-rear direction FB and is given a width which is substantially the same as a width of the wide portion 301*a* of the top plate 301.

A left side plate 303 and a right side plate 304 are provided on the key base member 300C in such a manner as to connect to the lower surface 301*q* of the top plate 301 and a rear surface 302*c* of the front plate 302. As shown in FIG. 5, the left side plate 303 on the left side L has a front side plate 303*a*, which constitutes a portion corresponding to the wide portion 301*a*, and a rear side plate 303*b*, which constitutes a portion corresponding to the narrow portion 301*b* of the top plate 301. The front side plate 303*a* and the rear side plate 303*b* are each formed into a substantially rectangular plate shape which is long in the front-rear direction FB and are provided to extend rectilinearly continuously (side surfaces thereof are disposed on substantially the same plane). A length QL1 of the front plate 303*a* in the front-rear direction FB of the key is made shorter than a length QL3 of the rear plate 303*b* in the front-rear direction FB of the key (QL1<QL3). A length QL2 of the front side plate 303*a* in the up-down direction UL is made longer than a length QL4 of the rear side plate 303*b* in the up-down direction UL (QL2>QL4).

As shown in FIG. 6, the right side plate 304 on the right side R has a front side plate 304*a*, which constitutes a portion corresponding to the wide portion 301*a*, and a rear side plate 304*b*, which constitutes a portion corresponding to the narrow portion 301*b* of the top plate 301. The front side plate 304*a* and the rear side plate 304*b* are connected in a step-like fashion by a connecting plate 304*c*, which is oriented in a direction perpendicular to the side plate 304 (the front side plate 304*a*, the rear side plate 304*b*) in association with the step portion 305. The front side plate 304*a* and the rear side plate 304*b* are each formed into a substantially rectangular shape which is long in the front-rear direction FB. A length QR1 of the front side plate 304*a* in the front-rear direction FB of the key is made shorter than a length QR3 of the rear side plate 304*b* in the front-rear direction FB of the key (QR1<QR3). A length QR2 of the front side plate 304*a* in the up-down direction UL is made longer than a length QR4 of the rear side plate 304*b* in the up-down direction UL (QR2>QR4).

As shown in FIGS. 5, 6, the length QL1 in the front-rear direction FB of the front side plate 303*a* of the left side plate 303 on the left side L is made longer than the length QR1 in the front-rear direction FB of the front side plate 304*a* of the right side plate 304 on the right side R (QL1>QR1). In addition, the length QL2 in the up-down direction UL of the front side plate 303*a* of the left side plate 303 on the left side L is made longer than the length QR2 in the up-down direction UL of the front side plate 304*a* of the right side plate 304 on the right side R (QL2>QR2). Here, the length QL3 in the front-rear direction FB of the rear side plate 303*b* of the left side plate 303 on the left side L is made shorter than the length QR3 in the front-rear direction FB of the rear side plate 304*b* of the right side plate 304 on the right side R (QL3<QR3). The length QL4 in the up-down direction UL of the rear side plate 303*b* of the left side plate 303 on the left side L is made substantially equal to the length QR4 in the up-down direction UL of the rear side plate 304*b* of the right side plate 304 on the right side R (QL4=QR4).

A plate-shaped switch pressing portion 33 is provided individually on the rear side plates 303*b*, 304*b* of the side plates 303, 304 which correspond to the narrow portion 301*b* in such a manner as to project towards the lower side Lo. In addition, a projection plate 306, which projects to the right side R, is provided on a lower surface of the side plate 304 which corresponds to the wide portion 301*a*. Similarly, a projection plate 307, which projects in the left-right direction, is provided individually on the lower surfaces of the side plates 303, 304 which correspond to the narrow portion 301*b*. In addition, an upper surface 32*a*1 of the left restricting projection 32*a* on the left side L and an upper surface 31*b* of the hammer pressing portion 31 on the left side L are disposed substantially on the same plane. Further, an upper surface of the projection plate 306 on the right side R and an upper surface 32*b*1 of the right restricting projection 32*b* on the right side R are disposed substantially on the same plane. An upper surface of a projection 31*c* (also refer to an encircled view of a portion SI in FIG. 4) which projects from an upper surface of the hammer pressing portion 31 on the right side R and an upper surface of the projection plate 307 on the right side R are disposed substantially on the same plane.

A rotational hole portion 308 is provided in a rear end portion of the key base member 300C in such a manner as to penetrate the rear end portion in the key aligning direction LR to be brought into rotatable engagement with the support shaft 25*a* in the interior case 25 which lies inside the interior of the case 20.

As shown in FIGS. 4 to 6, the first member 310 is disposed on the side plate 303 on the left side L, which is either of the left and right sides of the key base member 300C. The second plate 320 is disposed on the side plate 304 on the right side R, which is the other of the left and right sides of the key base member 300C. The first member 310 and the second member 320 are both formed into a woody plate using a woody material.

As shown in FIG. 4, the first member 310 has a shape corresponding to the side plate 303 on which the first member 310 is disposed. That is, the first member 310 includes a front portion 311 which is disposed on the front side plate 303*a* and a rear portion 312 which is disposed on the rear side plate 303*b* of the side plate 303, and the front portion 311 and the rear portion 312 are provided in such a manner as to extend continuously. A length in the up-down direction UL of the front portion 311 is made longer than a length in the up-down direction UL of the rear portion 312. An upper surface 310*a* of the first member 310 is formed into a continuous plane, and a lower surface 311 thereof is formed to define a step at a connecting portion of the front portion 311 with the rear portion 312.

The second member 320 has a shape corresponding to the side plate 304 on which the side member 320 is disposed. That is, the second member 320 includes a front second member 321 which is disposed on the front side plate 304*a* and a rear second member 322 which is disposed on the rear side plate 304*b* of the side plate 304. A length in the up-down direction UL of the front second member 321 is made longer than a length in the up-down direction UL of the rear second member 322.

Figure 7:
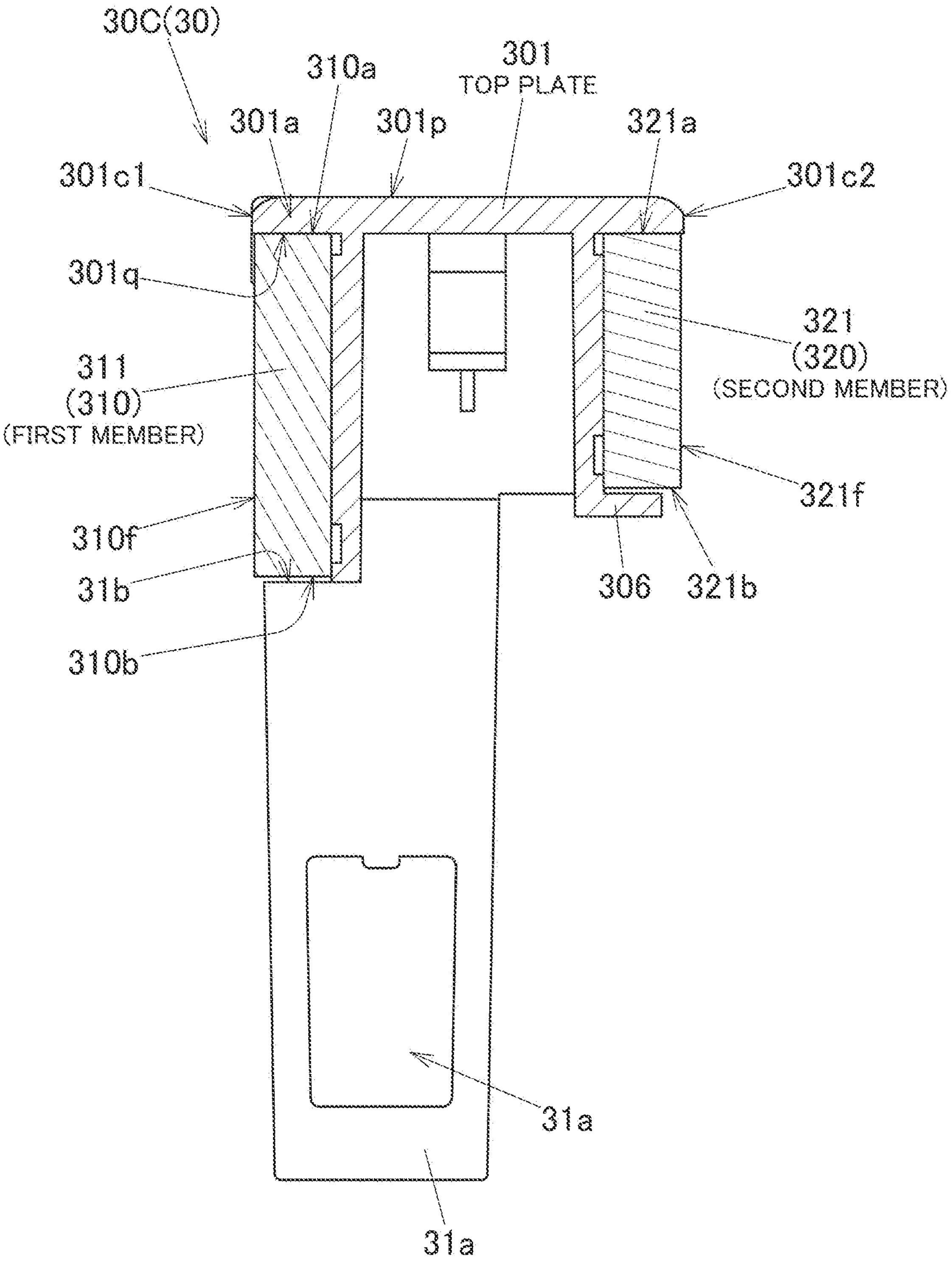
FIG. 7 is a sectional view of a white key of the keyboard instrument according to the embodiment of the present invention, taken along a line VII-VII in FIG. 5.

As shown in FIGS. 4 and 5, the first member 310 is disposed on the key base member 300C with an adhesive applied to a side surface 310*e* thereof which corresponds to an external surface of the side plate 303 while bringing a front surface 310*c* thereof into abutment with the rear surface 302*c* of the front plate 302 of the key base member 300C and bringing an upper surface 310*a* thereof into abutment with the lower surface 301*q* of the top plate 301. Then, as shown in FIG. 7, an external surface 310*f* of the first member 310 becomes substantially level with a side end 301*c*1 of the top plate 301 on the left side L on the same plane. Additionally, as shown in FIG. 4, since the front plate 302 is provided to have substantially the same width as that of the wide portion 301*a* of the top plate 301, the external surface 310*f* of the first member 310 also becomes level with a side end 302*a* of the front plate 302 on the left side L on the same plane. Here, a rear surface 310*d* of the first member 310 is not in abutment with a wall portion 303*d*, which is provided at a rear end of the side plate 303 in such a manner as to rise therefrom while facing the rear surface 310*d*, and hence, a gap is defined therebetween.

In addition, also at the rear portion 312 of the first member 310, the external surface 310*f* of the first member 310 becomes level with the side end 301*c*1 of the top plate 301 and the side end 302*a* of the front plate 302. As light gap is defined between the lower surface 310*b* of the first member 310, and the upper surface 32*a*1 of the left restricting projection 32*a*, the upper surface 31*b* of the hammer pressing portion 31 and the upper surface of the projection plate 307. The upper surface 32*a*1 of the left restricting projection 32*a*, the upper surface 31*b* of the hammer pressing portion 31 and the upper surface of the projection plate 307 are designed to support the first member 310 in the event that the first member 310 falls.

As shown in FIGS. 4 and 6, the front second member 321 of the second member 320 is disposed on the key base member 300C with an adhesive applied to a side surface 321*e* which faces an external surface of the front side plate 304*a* of the side plate 304 while bringing a front surface 321*c* thereof into abutment with the rear surface 302*c* of the front plate 302 of the key base member 300C and bringing an upper surface 321*a* thereof into abutment with the lower surface 301*q* of the top plate 301. Then, as shown in FIG. 7, an external surface 321*f* of the front second member 321 becomes level with a right side end 301*c*2 of the wide portion 301*a* of the top plate 301 on the same plane. Additionally, as shown in FIG. 4, the external surface 321*f* of the front second member 321 becomes level with a side end 302*b* of the front plate 302 on the right side R on the same plane.

Similarly, as shown in FIGS. 4 and 6, the rear second member 322 of the second member 320 is disposed on the key base member 300C with an adhesive applied to a side surface 322*e* which faces an external surface of the rear side plate 304*b* while bringing a front surface 322*c* thereof into abutment with the connecting plate 304*c* and bringing an upper surface 322*a* thereof into abutment with the lower surface 301*q* of the top plate 301. An external surface 322*f* of the rear second member 322 becomes level with a right side end 301*c*3 which corresponds to the narrow portion 301*b* of the top plate 301 on the same plane. A rear surface 322*d* of the rear second member 322 of the second member 320 is not in abutment with a wall portion 304*d* which is provided at a rear end of the side plate 304 in such a manner as to rise therefrom and which faces the rear surface 322*d*, whereby a gap is defined therebetween. In addition, a rear surface 321*d* of the front second member 321 of the second member 320 is left open.

That is, the side plates 303, 304 are provided in such positions that the side ends 301*c*1, 301*c*2, 302*a*, 302*b* of the top plate 301 and the front plate 302 become level with the side surfaces 310*f*, 321*f*, 322*f* of the first member 310 and the second member 320, which are disposed on the side plates 303, 304, respectively, on the same plane.

As shown in FIG. 8, the white key 30D includes a key base member 300D and two second members 320. Since a black key 40 is disposed on both left and right sides of the key base member 300D, a step portion 305 is also provided on both the sides of the key base member 300D. That is, a side plate 304L, which is substantially symmetrical with a side plate 304 provided on a right side R of the key base member 300D, is provided on a left side L of the key base member 300D. The side plate 304 on the right side R is similar to the side plate 304 of the white key 30C. As a result, the second member 320 is disposed individually on the left and right sides of the key base member 300D of the white key 30D. The second members 320 are attached in a similar manner to the manner in which the second member 320 on the right side R of the white key 30C is attached.

As shown in FIG. 9, the white key 300AL includes a key base member 300AL, a first member 310, and a second member 320. The key base member 300AL includes a step portion 305 which is formed on a right side R thereof for installation of a black key 40. That is, left and right side plates 303, 304 are provided in a similar manner to the manner in which the left and right side plates 303, 304 are provided on the white key 30C. As a result, the first member 310 is attached to a left side L and the second member 320 is attached to the right side R of the key base member 300AL of the white key 30AL.

As shown in FIG. 10, the white key 30CR includes a key base member 300CR and two first members 310. No step portion 305 is provided on the key base member 300CR. That is, a side plate 303R, which is substantially symmetrical with a side plate 303 which is provided on a left side L of the key base member 300CR, is provided on a right side R of the key base member 300CR. As a result, the first member 310 is disposed individually on the left and right sides of the key base member 300CR of the white key 30CR. The first members 310 are attached in a similar manner to the manner in which the first member 310 on the left side L of the white key 30C is attached to the corresponding key base member.

In this way, in the key base member 300, the first member 310 is disposed on the side plates 303, 303R on which no step portion 305 is provided and the second member 320 is disposed on the side plates 304, 304L on which the step portion 305 is provided.

Reference signs ha, hb, a, and b in FIGS. 4, and 8 to 12 will be defined as below.

ha: A length in the up-down direction UL of a portion of the second member 320 which corresponds to a nearer side of the key (refer to FIGS. 4, and 8 to 10). Here, the nearer side of the key is the nearer most side (front side) of the key in the longitudinal direction (front-rear direction).

hb: A length in the up-down direction UL of a portion of the first member 310 which corresponds to a nearer side of the key (refer to FIGS. 4, and 8 to 10).

a: A length in the up-down direction UL defined, when the white key 30 is depressed down, from an upper surface 301*p* of a portion of the top plate 301 which corresponds to a nearer side of the white key 30 so depressed down to the lower surface 301*q* of a portion of the top plate 301 which corresponds to a nearer side of the white key 30 lying adjacent to the depressed white key 30 (in other words, the upper surface 310*a* of a portion of the first member 310 which corresponds to the nearer side of the key or the upper surface 321*a* of a portion of the front second member 321 of the second member 320 which corresponds to the nearer side of the key) (refer to FIGS. 11, 12). In other words, a length in the up-down direction UL of the nearer side of the key which is exposed when the first member 310 or the front second member 321 of the second member 320 which is disposed on the keys other than the keys at both the ends of the keyboard 50 is depressed down.

b: A length in the up-down direction UL of a portion, lying on a near side of the key, of either of the first members 30 which are disposed at both the ends of the keyboard 50 which is exposed from the upper surface 21*a* of the upper case 21 on the left side L or the upper surface 21*b* of the upper case 21 on the right side R in such a state that the white key 30 (the white key 30AL, the white key 30CR) is not depressed down (refer to FIGS. 11, 12).

In the keyboard instrument 10 according to the present embodiment, hb is larger than b (hb>b). As a result, even when the case 20 is used in which the upper surfaces 21*a*, 21*b*, which slope downwards, are provided at the left-end part on the left side L and the right-end part on the right side R of the upper case 21, there occurs no such case that the lower surface 310*b* of the woody first member 310 is exposed on the left-side surface and the right-side surface of the white keys 30AL, 30CR which are exposed.

In addition, in the keyboard instrument 10 according to the present embodiment, ha is larger than a (ha>a). As a result, even when the white key 30 is depressed down, there occurs no such case that the lower surface 321*b* of the front second member 321 of the second member 320 of the white key 30 which lies adjacent to the depressed white key 30 is exposed. Further, hb differs from ha (hb≠ha), and hb is larger than ha (hb>ha).

As a result, even when the first member 310 is disposed individually on the adjacent white keys 30, there occurs no such case that the lower surface 310*b* of the relevant first member 310 is exposed.

In the present embodiment, b is larger than a (b>a). As a result, to summarize the relationship among the reference signs described heretofore, in the keyboard instrument 10 according to the present embodiment, the relationship results in which hb>b>ha>a.

Here, in the present embodiment, the first member 310 and the second member 320 include the portions (the rear portion 312 of the first member 310, the rear second member 322 of the second member 320) which correspond to the narrow portion 301*b* of the white key 30, however, the side surface of the white key 30 which corresponds to the narrow portion 301*b* at which the black key 40 is disposed is exposed little when the white key 30 is depressed down, and hence, the portions (the rear portion 312 of the first member 310, the rear second member 322 of the second member 320) which correspond to the narrow portion 301*b* of the white key 30 can be omitted.

The second member 320 is disposed individually on the side surfaces of the white keys 30 as keys of the keyboard 50 (the right-side surface of the white key 30AL, the left-side surfaces of the white keys 30B, the right-side surfaces of the white keys 30C, the left- and right-side surfaces of the white keys 30D, the left-side surfaces of the white keys 30E, the right-side surfaces of the white keys 30F, the left- and right-side surfaces of the white keys 30G) on which the step portion 305 is disposed for installation of the black key 40. The first member 310 is disposed on the side surfaces of the white keys 30 which extend in a straight line with no step portion 305 provided thereon (the left-side surface of the white key 30AL, the right-side surfaces of the white keys 30B, the left-side surfaces of the white keys 30C, the right-side surfaces of the white keys 30E, the left-side surfaces of the white keys 30F, the left- and right-side surfaces of the white key 30CR) As a result, even with the keyboard 50 of the keyboard instrument 10 whose design is improved by providing the upper surfaces 21*a*, 21*b* of the upper case 21 in such a manner as to slope down, the woody members suffice by use of the first members 310 and the second members 320 which each have the front second member 321 and the rear second member 322, whereby the commonization of components can be promoted.

That is, with the proposed idea based on the present embodiment, the three types of members are good enough as the members which are disposed on the side surfaces of the key base members. Adopting the proposed idea can provide a visually aesthetic keyboard instrument even though the keyboard instrument is such that both the ends of the keyboard are exposed to the outside. In addition, with the proposed idea based on the present embodiment, since only the three types of members are used as the members which are disposed on the side surfaces of the key base members, the relevant members can easily be disposed on the side surfaces of the key base members, thereby making it possible to reduce further the production cost of the keyboard instrument.

With the embodiment of the present invention, the keyboard instrument 10 includes the key base member 300, the first member 310 which is disposed on either of the left and right sides of the key base member 300, and the second member 320 which is disposed on the other of the left and right sides of the key base member 300. In addition, the length hb in the up-down direction UL of the portion of the first member 310 which corresponds to the nearer side of the key differs from the length ha in the up-down direction UL of the portion of the second member 320 which corresponds to the nearer side of the key.

As a result, even though the shape of the case 20 is thought out, a risk of the lower surfaces of the first member 310 and the second member 320 which are attached to the side surfaces of the key base member 300 becoming visible can be reduced. As a result, even though the keyboard instrument 10 is viewed from various angles, the woody members or the like can be seen without interruption from the side surfaces of the keys, thereby making it possible to provide the keyboard instrument 10 whose visual quality is improved.

The length hb in the up-down direction UL of the portion of the first member 310 which corresponds to the nearer side of the key is made longer than the length b in the up-down direction UL of the portion of the first member 310 which is disposed at, at least, one of the ends of the keyboard 50, the portion lying to correspond to the nearer side of the key and exposed from the upper surface 21*a* or the upper surface 21*b* of the case 20 in such a state that the key is not depressed down and the length a in the up-down direction UL of the portion of the front second member 321 of the second member 320 which corresponds to the nearer side of the key. As a result, even though the exposure ranges of the external side surfaces of the leftmost white key 30AL and the rightmost key 30CR are larger than the exposure range of the white key 30 which lies adjacent to the white key 30 which is depressed down, the woody member or the like can be exposed as required.

The upper surfaces 21*a*, 21*b* of the upper case 21, which lie adjacent to the leftmost and rightmost white keys 30AL, 30CR, respectively, are each made into the sloping surface which slopes down towards the nearer side of the key. As a result, even with the keyboard instrument 10 whose design is improved by inclining the upper surfaces 21*a*, 21*b* of the case 20 (the upper case 21) which lie adjacent to the leftmost and rightmost white keys 30AL, 30CR, the woody members can be exposed as required.

The key base member 300 includes the top plate 301 including the key depressing surface, the front plate 302 having substantially the same width as that of the top plate 301 and provided in such a manner as to extend downwards from the front end portion of the top plate 301, and the left and right side plates 303, 304 which connect the lower surface 301*q* of the top plate 301 and the rear surface 302*c* of the front plate 302. The first member 310 and the second member 320 are disposed on the side plates 303, 304, respectively, while being brought into abutment with the lower surface 301*q* of the top plate 301 and the rear surface 302*c* of the front plate 302, and the side plates 303, 304 are provided in such positions that the side ends 301*c*1, 301*c*2, 302*a*, 302*b* of the top plate 301 and the front plate 302 are level with the external surfaces 310*f*, 321*f*, 322*f* of the first member 310 and the second member 320 on the same plane. As a result, the white keys 30 can be provided to be seen as if all the white keys 30 are formed of a woody material, thereby making it possible to provide the keyboard instrument 10 which looks better. Here, the top plate 301, the front plate 302, and the side plates 303, 304 do not necessarily need to have the plate shape but may have a block shape.

In the key base member 300, the side plate 303 of, for example, the white key 30C on which the first member 310 is disposed is provided to extend continuously in a straight line, and the side plate 304 of, for example, the white key 30C on which the second member 320 is disposed is provided in such a manner as to extend in the step-like fashion. As a result, in, for example, the white key 30C, the first member 310 (the rear portion 312), which is woody, and the rear second member 322 of the second member 320, which is woody, can also be disposed on the rear side plates 303*b*, 304*b* which correspond to the black key 40.

The first member 310 has the front portion 311 corresponding to the nearer side of the key and the rear portion 312 which is shorter in the length in the up-down direction UL than the front portion 311. As a result, even on the side plate 303 or the like which extends continuously, a wood material can be disposed even on the portion which lies adjacent to the black key 40.

The second member 320 has the front second member 321 and the rear second member 322 whose length in the up-down direction UL is shorter than that of the front second member 321. As a result, even on the stepped side plate 304 or the like, a wood material can be disposed even on the portion which lies adjacent to the black key 40.

In addition, in the present embodiment, the member disposed on the side surfaces of the key base member is described as being the woody member, however, the relevant member does not necessarily need to be the wood member but may be a member which imitates wood grains.

While the embodiment of the present invention has been described heretofore, the embodiment is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and their modifications are included in the scope and gist of the present invention and are also included in the scope of inventions claimed for patent under claims below and their equivalents.

What is claimed is:

1. A keyboard instrument comprising:

a key base member;

a first member disposed on one of a left and a right side of the key base member in a key aligning direction; and a second member disposed on the other of the left and the right side of the key base member on which the first member is not disposed, wherein a length in an up-down direction of a portion of the first member which corresponds to a nearer side of a key differs from a length in the up-down direction of a portion of the second member which corresponds to the nearer side of the key.

2. The keyboard instrument according to claim 1, wherein the length in the up-down direction of the portion of the first member which corresponds to the nearer side of the key is longer than (i) a length in the up-down direction of a second portion of the first member which is disposed at, at least, one of respective ends of a keyboard, the second portion corresponding to the nearer side of the key and being exposed from an upper surface of a case in such a state that the key is not depressed down, and (ii) the length in the up-down direction of the portion of the second member which corresponds to the nearer side of the key.

3. The keyboard instrument according to claim 2, wherein the upper surface of the case comprises a sloping surface which slopes down towards the nearer side of the key.

4. The keyboard instrument according to claim 1, wherein:

the key base member comprises a top plate having a key depressing surface, a front plate having a width substantially identical to a width of the top plate and provided in such a manner as to extend downwards from a front end portion of the top plate, and left and right side plates which connect a lower surface of the top plate and a rear surface of the front plate, the first member or the second member is disposed on one of the side plates while being in abutment with the lower surface of the top plate and the rear surface of the front plate, and the side plates are provided at positions such that respective side ends of the top plate and the front plate and a side surface of the first member or the second member are level with each other on an identical plane.

5. The keyboard instrument according to claim 2, wherein:

the key base member comprises a top plate having a key depressing surface, a front plate having a width substantially identical to a width of the top plate and provided in such a manner as to extend downwards from a front end portion of the top plate, and left and right side plates which connect a lower surface of the top plate and a rear surface of the front plate, the first member or the second member is disposed on one of the side plates while being in abutment with the lower surface of the top plate and the rear surface of the front plate, and the side plates are provided at positions such that respective side ends of the top plate and the front plate and a side surface of the first member or the second member are level with each other on an identical plane.

6. The keyboard instrument according to claim 3, wherein:

the key base member comprises a top plate having a key depressing surface, a front plate having a width substantially identical to a width of the top plate and provided in such a manner as to extend downwards from a front end portion of the top plate, and left and right side plates which connect a lower surface of the top plate and a rear surface of the front plate, the first member or the second member is disposed on one of the side plates while being in abutment with the lower surface of the top plate and the rear surface of the front plate, and the side plates are provided at positions such that respective side ends of the top plate and the front plate and a side surface of the first member or the second member are level with each other on an identical plane.

7. The keyboard instrument according to claim 4, wherein the key base member is configured such that the side plate on which the first member is disposed is provided to extend in a straight line continuously and the side plate on which the second member is disposed is provided to extend in a step-like fashion.

8. The keyboard instrument according to claim 5, wherein the key base member is configured such that the side plate on which the first member is disposed is provided to extend in a straight line continuously and the side plate on which the second member is disposed is provided to extend in a step-like fashion.

9. The keyboard instrument according to claim 6, wherein the key base member is configured such that the side plate on which the first member is disposed is provided to extend in a straight line continuously and the side plate on which the second member is disposed is provided to extend in a step-like fashion.

10. The keyboard instrument according to claim 1, wherein the first member comprises a front portion corresponding to the nearer side of the key and a rear portion whose length in the up-down direction is shorter than a length of the front portion in the up-down direction.

11. The keyboard instrument according to claim 2, wherein the first member comprises a front portion corresponding to the nearer side of the key and a rear portion whose length in the up-down direction is shorter than a length of the front portion in the up-down direction.

12. The keyboard instrument according to claim 3, wherein the first member comprises a front portion corresponding to the nearer side of the key and a rear portion whose length in the up-down direction is shorter than a length of the front portion in the up-down direction.

13. The keyboard instrument according to claim 1, wherein the second member comprises a front second member and a rear second member whose length in the up-down direction is shorter than a length of the front second member in the up-down direction.

14. The keyboard instrument according to claim 2, wherein the second member comprises a front second member and a rear second member whose length in the up-down direction is shorter than a length of the front second member in the up-down direction.

15. The keyboard instrument according to claim 3, wherein the second member comprises a front second member and a rear second member whose length in the up-down direction is shorter than a length of the front second member in the up-down direction.

* * * * *